United States Patent
Horiguchi

(10) Patent No.: US 12,291,206 B2
(45) Date of Patent: May 6, 2025

(54) VEHICLE TRAVELING CONTROL APPARATUS

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 269 days.

(21) Appl. No.: 18/055,943

(22) Filed: Nov. 16, 2022

(65) Prior Publication Data

US 2023/0182736 A1  Jun. 15, 2023

(30) Foreign Application Priority Data

Dec. 14, 2021 (JP) ................................ 2021-202903

(51) Int. Cl.
*B60W 30/165* (2020.01)
*B60W 40/072* (2012.01)

(52) U.S. Cl.
CPC ........ *B60W 30/165* (2013.01); *B60W 40/072* (2013.01); *B60W 2554/80* (2020.02); *B60W 2556/65* (2020.02)

(58) Field of Classification Search
CPC ............. B60W 30/165; B60W 40/072; B60W 2554/80; B60W 2556/65; B60W 2420/403; B60W 10/04; B60W 10/18; B60W 2520/10; B60W 2520/125; B60W 2540/18; B60W 2552/30; B60W 2556/50; B60W 2720/10; B60W 2720/125; B60W 2754/30; B60W 30/16

See application file for complete search history.

(56) References Cited

U.S. PATENT DOCUMENTS

2010/0256852 A1 * 10/2010 Mudalige ................. G08G 1/22
701/24
2017/0344023 A1 * 11/2017 Laubinger ........... B60W 30/165

FOREIGN PATENT DOCUMENTS

JP  2003-327012 A  11/2003

OTHER PUBLICATIONS

JP 3812840 B2 with English translation; date filed May 9, 2003; date published Aug. 23, 2006. (Year: 2006).*

* cited by examiner

*Primary Examiner* — Calvin Cheung
(74) *Attorney, Agent, or Firm* — Rimon P.C.

(57) ABSTRACT

A vehicle traveling control apparatus is configured to be applied to a vehicle and includes a traveling environment data acquiring unit and a traveling controller. The traveling controller includes a preceding vehicle recognizing unit, a curve curvature detecting unit, and a vehicle speed keep controlling unit. The preceding vehicle recognizing unit is configured to recognize a preceding vehicle, based on traveling environment data acquired by the traveling environment data acquiring unit. The curve curvature detecting unit is configured to detect a curvature of a curved road, based on the traveling environment data or road map data. The vehicle speed keep controlling unit is configured such that, in a case where the preceding vehicle recognizing unit loses track of the preceding vehicle, the vehicle speed keep controlling unit cause the vehicle to travel on the basis of a preceding-vehicle-following vehicle speed that is before losing track of the preceding vehicle.

7 Claims, 7 Drawing Sheets

VEHICLE TRAVELING CONTROL APPARATUS

CROSS-REFERENCE TO RELATED APPLICATIONS

The present application claims priority from Japanese Patent Application No. 2021-202903 filed on Dec. 14, 2021, the entire contents of which are hereby incorporated by reference.

BACKGROUND

The disclosure relates to a vehicle traveling control apparatus.

Various proposals have been made on techniques related to a driving assist for a vehicle in recent years. The techniques aim to reduce a burden to be imposed on a driver who drives the vehicle and allow for comfortable and stable driving. Some of such techniques have been already put into practical use.

The drive assist includes an adaptive cruise control (ACC) function and a lane keeping function to cause an own vehicle to travel autonomously along a traveling lane while keeping a distance between the own vehicle and a preceding vehicle. The drive assist also makes it possible to cause the own vehicle to travel autonomously to a destination by including a locator function.

An ACC control recognizes the distance between the own vehicle and the preceding vehicle by a front recognition device and causes the own vehicle to travel while following the preceding vehicle. For example, the front recognition device may include an in-vehicle camera or various radar sensors mounted on the own vehicle, or any combination thereof.

The ACC control controls a vehicle speed, or an own vehicle speed, of the own vehicle and so cause the own vehicle to follow the preceding vehicle while keeping a target inter-vehicle distance between the own vehicle and the preceding vehicle, in a case where the target inter-vehicle distance with respect to the preceding vehicle becomes short and the preceding vehicle travels at a speed slower than a set vehicle speed of the own vehicle. The ACC control accelerates the own vehicle to the set vehicle speed and causes the own vehicle to travel at a constant speed, in a case where the preceding vehicle has traveled away from a traveling lane of the own vehicle.

Sometimes, the own vehicle can temporarily lose track of the preceding vehicle that travels ahead of the own vehicle by being blocked by an obstacle such as a wall, at a curve or a sharp curve where a change in a curvature from an entrance of the curve is large. In such a case, the own vehicle can become too close to the preceding vehicle in a case where the own vehicle speed is simply increased to the set vehicle speed.

For example, Japanese Unexamined Patent Application Publication (JP-A) No. 2003-327012 discloses a technique that detects a road curvature on the basis of data on a traveling environment ahead of an own vehicle acquired by an in-vehicle camera, and that automatically controls the own vehicle to decelerate in a case where an own vehicle speed is determined as being equal to or greater than a predetermined value with respect to the detected road curvature.

SUMMARY

An aspect of the disclosure provides a vehicle traveling control apparatus to be applied to a vehicle. The vehicle traveling control apparatus includes a traveling environment data acquiring unit and a traveling controller. The traveling environment data acquiring unit is configured to acquire traveling environment data. The traveling environment data is data on a traveling environment ahead of the vehicle. The traveling controller is configured to cause the vehicle to travel and follow a preceding vehicle. The traveling controller includes a preceding vehicle recognizing unit, a curve curvature detecting unit, and a vehicle speed keep controlling unit. The preceding vehicle recognizing unit is configured to recognize the preceding vehicle as a target to be followed by the vehicle, on the basis of the traveling environment data. The curve curvature detecting unit is configured to detect a curvature of a curved road, on the basis of the traveling environment data or road map data. The vehicle speed keep controlling unit is configured such that in a case where the preceding vehicle recognizing unit loses track of the preceding vehicle as the target to be followed by the vehicle, the vehicle speed keep controlling unit causes the vehicle to travel on the basis of a preceding-vehicle-following vehicle speed that is before losing track of the preceding vehicle. The preceding-vehicle-following vehicle speed is a vehicle speed of the vehicle directed to follow the preceding vehicle.

An aspect of the disclosure provides a vehicle traveling control apparatus to be applied to a vehicle. The vehicle traveling control apparatus includes a sensor and circuitry. The sensor is configured to acquire traveling environment data. The traveling environment data is data on a traveling environment ahead of the vehicle. The circuitry is configured to cause the vehicle to travel and follow a preceding vehicle. The circuitry is configured to recognize the preceding vehicle as a target to be followed by the vehicle, on the basis of the traveling environment data. The circuitry is configured to detect a curvature of a curved road, on the basis of the traveling environment data or road map data. The circuitry is configured such that, in a case where the preceding vehicle as the target to be followed by the vehicle is lost in tracking, the circuitry causes the vehicle to travel on the basis of a preceding-vehicle-following vehicle speed that is before losing track of the preceding vehicle. The preceding-vehicle-following vehicle speed is a vehicle speed of the vehicle directed to follow the preceding vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
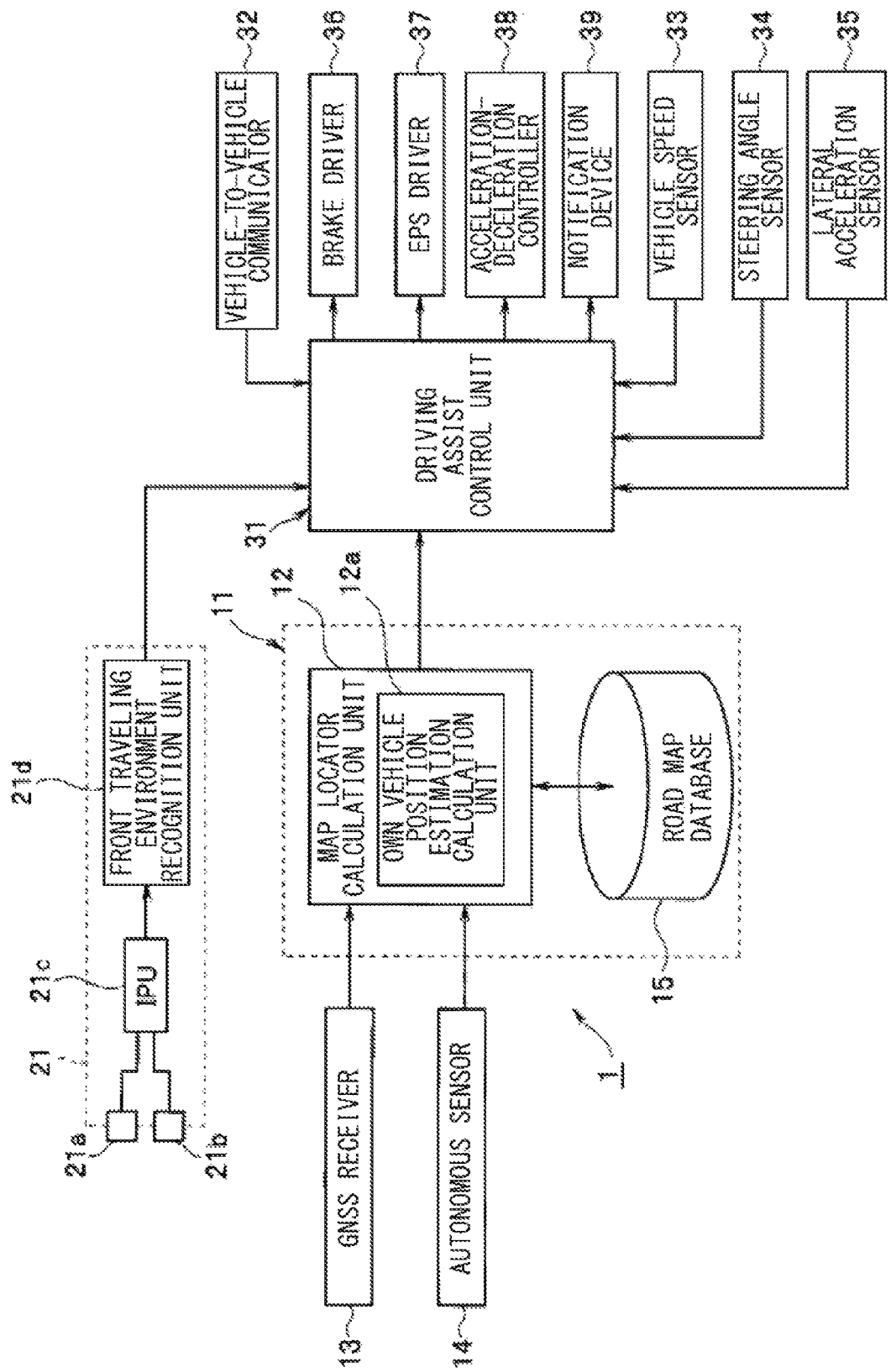
FIG. 1 is a diagram schematically illustrating a configuration of a vehicle traveling control apparatus 1 according to one example embodiment of the disclosure.

A technique disclosed in JP-A No. 2003-327012 accelerates an own vehicle when the own vehicle so travels along a curved road as to follow a preceding vehicle, in a case where an own vehicle speed at the time of losing track of the preceding vehicle is equal to or less than a predetermined threshold with respect to a curvature of the curved road. Accordingly, a relatively large lateral acceleration rate (lateral G) or yaw rate is generated at the own vehicle at a sharp curve where a curvature changes relatively largely from an entrance of the curve, which can give a person on board a sense of discomfort.

It is desirable to provide a vehicle traveling control apparatus that makes it possible to reduce a sense of discomfort to be given to a person on board.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 5:
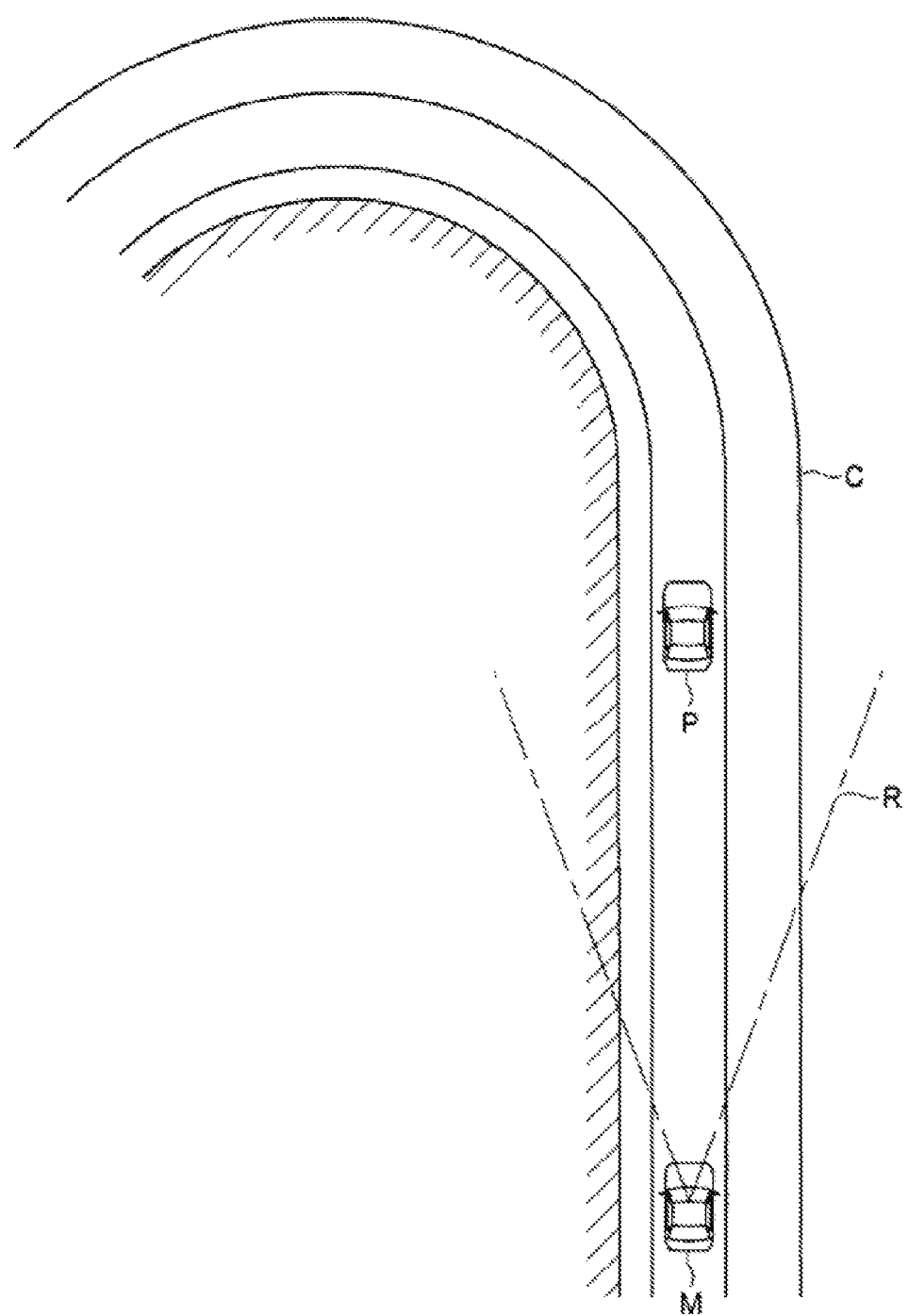
FIG. 5 is a plane diagram illustrating an example of a state in which an own vehicle enters a curved road while following a preceding vehicle.
Figure 6:
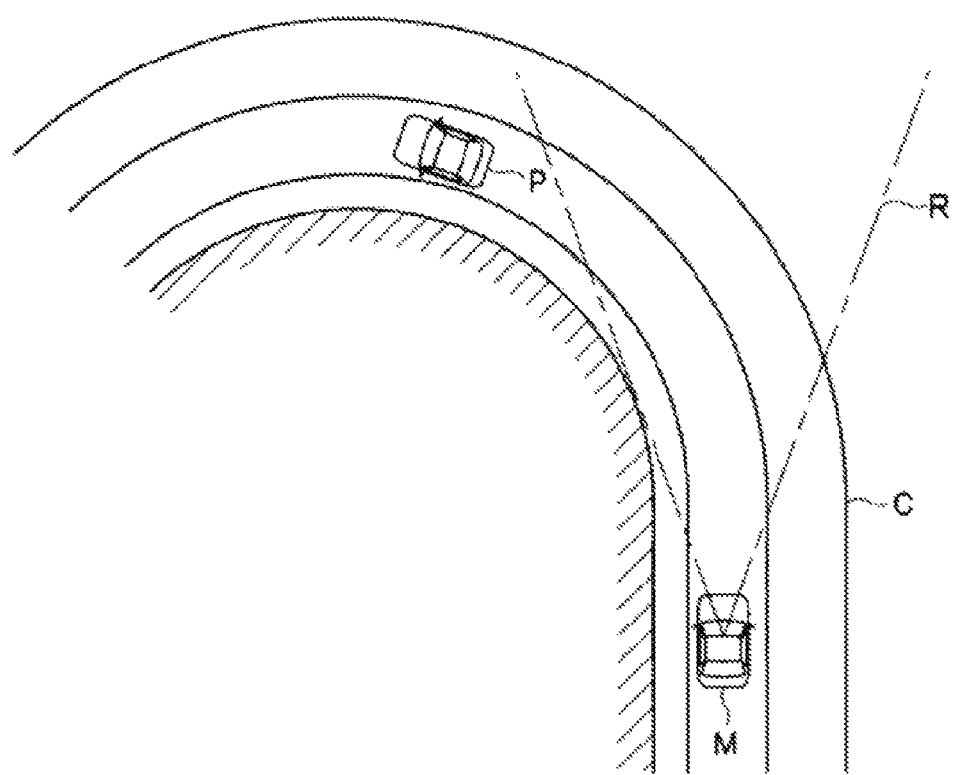
FIG. 6 is a plane diagram illustrating an example of a state in which the own vehicle has lost track of the preceding vehicle at the curved road.
Figure 7:
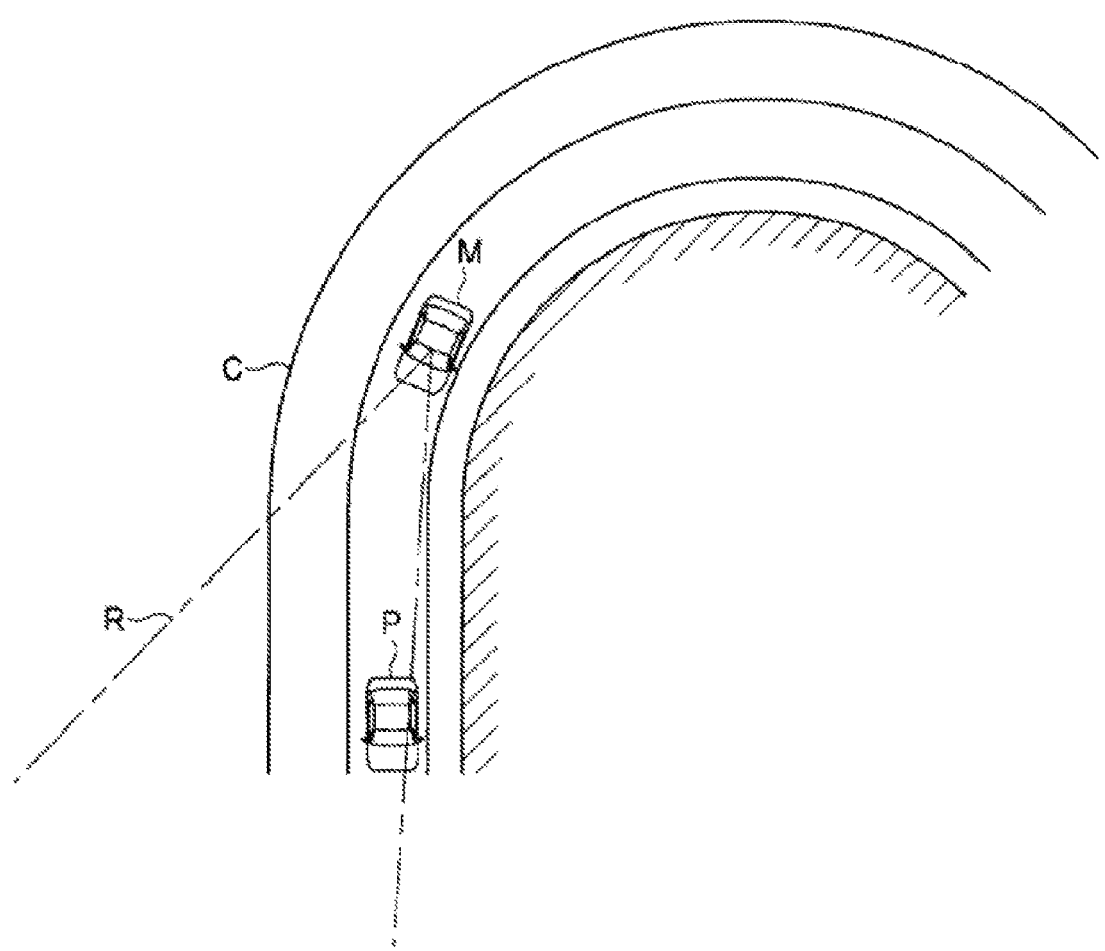
FIG. 7 is a plane diagram illustrating an example of a state in which the preceding vehicle is caught at an exit of the curved road.

Referring to FIG. 1, a vehicle traveling control apparatus 1 is mounted on an own vehicle M illustrated in FIGS. 5 to 7. For description purpose, described below is an example embodiment in which the own vehicle M keeps to the left side of a road along a traveling lane. For a road in which the own vehicle M keeps to the right side along a traveling lane, the right and the left are to be read in reverse in the example embodiment.

The vehicle traveling control apparatus 1 includes a camera unit 21 and a driving assist control unit 31. The vehicle traveling control apparatus 1 may also include an own vehicle position estimating unit 11. In one embodiment, the camera unit 21 may serve as a "traveling environment data acquiring unit" or a "detector". In one embodiment, the driving assist control unit 31 may serve as a "traveling controller".

The own vehicle position estimating unit 11 may include a map locator calculation unit 12 and a road map database 15. The map locator calculation unit 12, a later-described front traveling environment recognition unit 21d, and the driving assist control unit 31 each may be or may include a microcontroller. The microcontroller may include a central processing unit (CPU), a random-access memory (RAM), a read-only memory (ROM), a rewritable non-volatile memory, and a peripheral device. The non-volatile memory may be a flash memory or an electrically erasable programmable read-only memory (EEPROM). The ROM may hold a program necessary for the CPU to execute each process, fixed data, or any other data. The RAM may serve as a work area of the CPU, and may temporarily hold various pieces of data to be used by the CPU. The CPU may also be a micro processing unit (MPU) or a processor. In some embodiments, a graphics processing unit (GPU) or a graph streaming processor (GSP) may be used instead of the CPU. In some embodiments, the CPU, the GPU, and the GSP may be selectively used in any combination.

The map locator calculation unit 12 may have an input side coupled to a global navigation satellite system (GNSS) receiver 13 and an autonomous sensor 14. The GNSS receiver 13 may receive a positioning signal transmitted from a plurality of positioning satellites. The autonomous sensor 14 may be any sensor that detects a traveling state of the own vehicle M. The autonomous sensor 14 may have sensors including, for example, a vehicle speed sensor 33, a steering angle sensor 34, and a lateral acceleration sensor 35 which are to be described later, and a longitudinal acceleration sensor. In one embodiment, the lateral acceleration sensor 35 may serve as a "lateral acceleration rate detector".

The map locator calculation unit 12 may include an own vehicle position estimation calculation unit 12a. The own vehicle position estimation calculation unit 12a may estimate positional coordinates of a current position of the own vehicle M, such as a latitude, a longitude, or an altitude. For example, the own vehicle position estimation calculation unit 12a may estimate an own vehicle position on the basis of the positioning signal in a case where the positioning signal is receivable by the GNSS receiver 13. The own vehicle position estimation calculation unit 12a may perform a localization on the basis of data obtained by the autonomous sensor 14 in an environment where a sensitivity of reception from the GNSS satellites is low and the positioning signal is not effectively receivable accordingly, such as inside a tunnel.

The road map database 15 may be a mass storage medium such as a hard disk drive (HDD), and hold known road map data. The own vehicle position estimation calculation unit 12a may perform map matching of the acquired positional coordinates such as the latitude, the longitude, or the altitude, and estimate the own vehicle position, i.e., a current position, on a road map. The road map data may be static map data that indicates a state of a road, such as a type of a road, a road shape, a curve curvature, a road azimuth, a lane width, or an intersection. The type of the road may indicate whether the road is a general road, a main road, or a freeway. The intersection may indicate whether the road is a crossroad or a T-junction.

The camera unit 21 may be fixed at an upper middle part of a front interior side of the own vehicle M. The camera unit 21 may include an in-vehicle camera, an image processing unit (IPU) 21c, and the front traveling environment recognition unit 21d. The in-vehicle camera may be a stereo camera that includes a main camera 21a and a sub-camera 21b disposed at respective positions bilaterally symmetric to each other about the middle in a vehicle width direction, i.e., about the middle of a width of the own vehicle M. The camera unit 21 may acquire reference image data on the basis of imaging performed by the main camera 21a, and acquire comparison image data on the basis of imaging performed by the sub-camera 21b.

The IPU 21c may perform a predetermined image process on the reference image data and the comparison image data. The front traveling environment recognition unit 21d may read the reference image data and the comparison image data each having been subjected to the image process by the IPU 21c, and calculate, by means of the principle of triangulation, distance data of the same target (i.e., a distance from the own vehicle M to the target) in the reference image data and the comparison image data on the basis of a parallax between the reference image data and the comparison image data. Thereafter, the front traveling environment recognition unit 21*d* may perform a known grouping process on the distance data and compare the distance data having been subjected to the grouping process with data held in advance, such as three-dimensional road map data or three-dimensional object data. In other words, the front traveling environment recognition unit 21*d* may perform pattern matching. Thus, the front traveling environment recognition unit 21*d* may extract front traveling environment data such as road shape data, three-dimensional fixed object data, or moving object data. For example, the road shape data may include data on a curved road C illustrated in FIGS. 5 to 7. The three-dimensional fixed object data may include data on lane lines that define right and left lane lines of a lane and data on an obstacle such as a wall or a guardrail. The moving object data may include data on a moving object such as a vehicle.

The driving assist control unit 31 may read the front traveling environment data. The driving assist control unit 31 may have an input side coupled to the front traveling environment recognition unit 21*d* of the camera unit 21 and the map locator calculation unit 12. The input side of the driving assist control unit 31 may also be coupled to a vehicle-to-vehicle communicator 32, and the autonomous sensor 14 including, for example, the vehicle speed sensor 33, the steering angle sensor 34, and the lateral acceleration sensor 35. In one embodiment, the vehicle-to-vehicle communicator 32 may serve as a "communicator".

The vehicle-to-vehicle communicator 32 may perform a mutual communication between the own vehicle M and another vehicle, and acquire data on a driving state of a vehicle of interest through the vehicle-to-vehicle mutual communication. The vehicle speed sensor 33 may detect a vehicle speed (an own vehicle speed) Vs of the own vehicle M. The steering angle sensor 34 may detect a steering angle of a steered wheel or a front wheel. The lateral acceleration sensor 35 may detect a lateral acceleration rate (lateral G) generated at the own vehicle M. In some embodiments, a yaw rate sensor that detects a yaw rate acting on the own vehicle M may be added in addition to the sensors described above.

The driving assist control unit 31 may have an output side coupled to devices including, for example, a brake driver 36, an electronic power steering motor driver (an EPS driver) 37, an acceleration-deceleration controller 38, and a notification device 39. The notification device 39 may notify a driver who drives the own vehicle M of information that calls attention to the driver. The notification device 39 may be a device such as a monitor or a speaker.

The driving assist control unit 31 may cause the acceleration-deceleration controller 38 to perform a predetermined operation to execute various driving assist controls. The acceleration-deceleration controller 38 may control the brake driver 36, the EPS driver 37, and an output of a drive source such as an engine or an electric motor. Non-limiting examples of the various drive assist control may include a known ACC control, a known active lane keep (ALK) control, and a known lane departure prevention (LDP) control.

The ACC control may control the vehicle speed and causes the own vehicle M to follow a preceding vehicle with a preset inter-vehicle distance being kept, in a case where the preceding vehicle to follow is recognized by the front traveling environment recognition unit 21*d*. The ACC control may perform constant speed traveling at a set vehicle speed in a case where no preceding vehicle is detected. The ALK control may recognize, on the basis of the front traveling environment data, the right and the left lane lines along which the own vehicle M is to travel, and so perform a steering control as to cause the own vehicle M to travel along the middle of the recognized lane lines. The LDP control may determine, on the basis of the front traveling environment data, a lateral position of the own vehicle M with respect to the right and the left lane lines along which the own vehicle M is to travel, and so perform a steering control that the own vehicle M becomes parallel to the lane lines in a case where the lateral position is estimated as crossing the lane line to thereby prevent the own vehicle M from departing from the lane lines. The notification device 39 may notify, on the basis of a command signal from the driving assist control unit 31, the driver of an alarm visually and/or auditory. For example, the notification device 39 may notify the alarm visually through the use of displaying on a monitor or lighting of a lamp, and may notify the alarm auditory through the use of a buzzer sound or a voice.

Referring to FIG. 5, if a curvature of the curved road C is large in a case where the own vehicle M follows a preceding vehicle P and enters the curved road C, the preceding vehicle P can become outside an angle of view of the camera unit 21 mounted on the own vehicle M as illustrated in FIG. 6, which can cause the camera unit 21 to lose track of the preceding vehicle P. The ACC control can attempt to accelerate the own vehicle M to the set vehicle speed in a case where the preceding vehicle P to follow is no longer detected. However, the ACC control can cause the own vehicle M to suddenly decelerate to increase the inter-vehicle distance with respect to the preceding vehicle P, in a case where the preceding vehicle P is caught at around a location at which the own vehicle M finishes turning a sharp curve of the curved road C. As a result, a person on board including the driver can feel a sense of discomfort.

Accordingly, the driving assist control unit 31 according to the example embodiment may cause the own vehicle M to continue following the preceding vehicle P by the ACC control on the basis of data on a driving state of the preceding vehicle P acquired by the vehicle-to-vehicle communicator 32, in a case where the camera unit 21 has temporarily lost track of the preceding vehicle P at the sharp curve.

Figure 2:
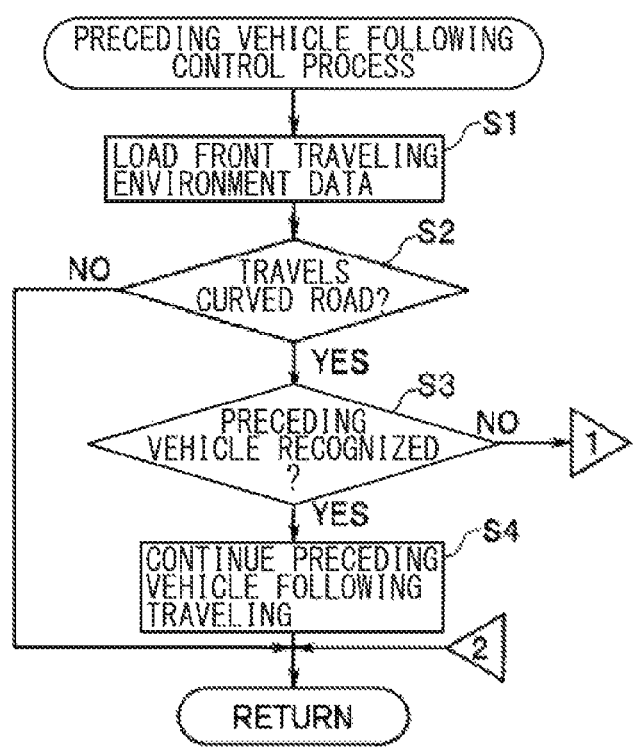
FIG. 2 is a flowchart illustrating an example of a routine of a preceding vehicle following control process.
Figure 3:
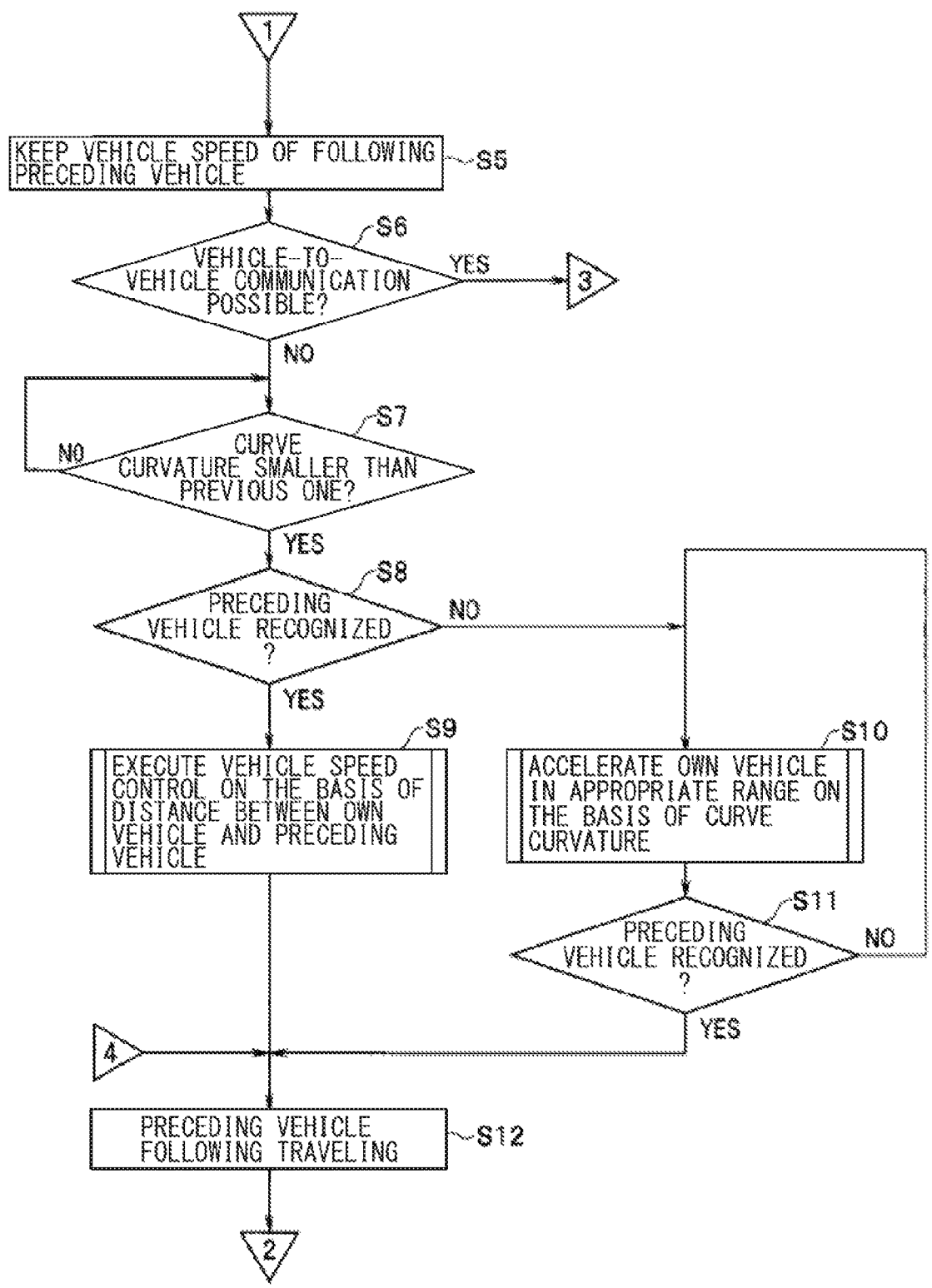
FIG. 3 is another flowchart illustrating an example of the routine of the preceding vehicle following control process.
Figure 4:
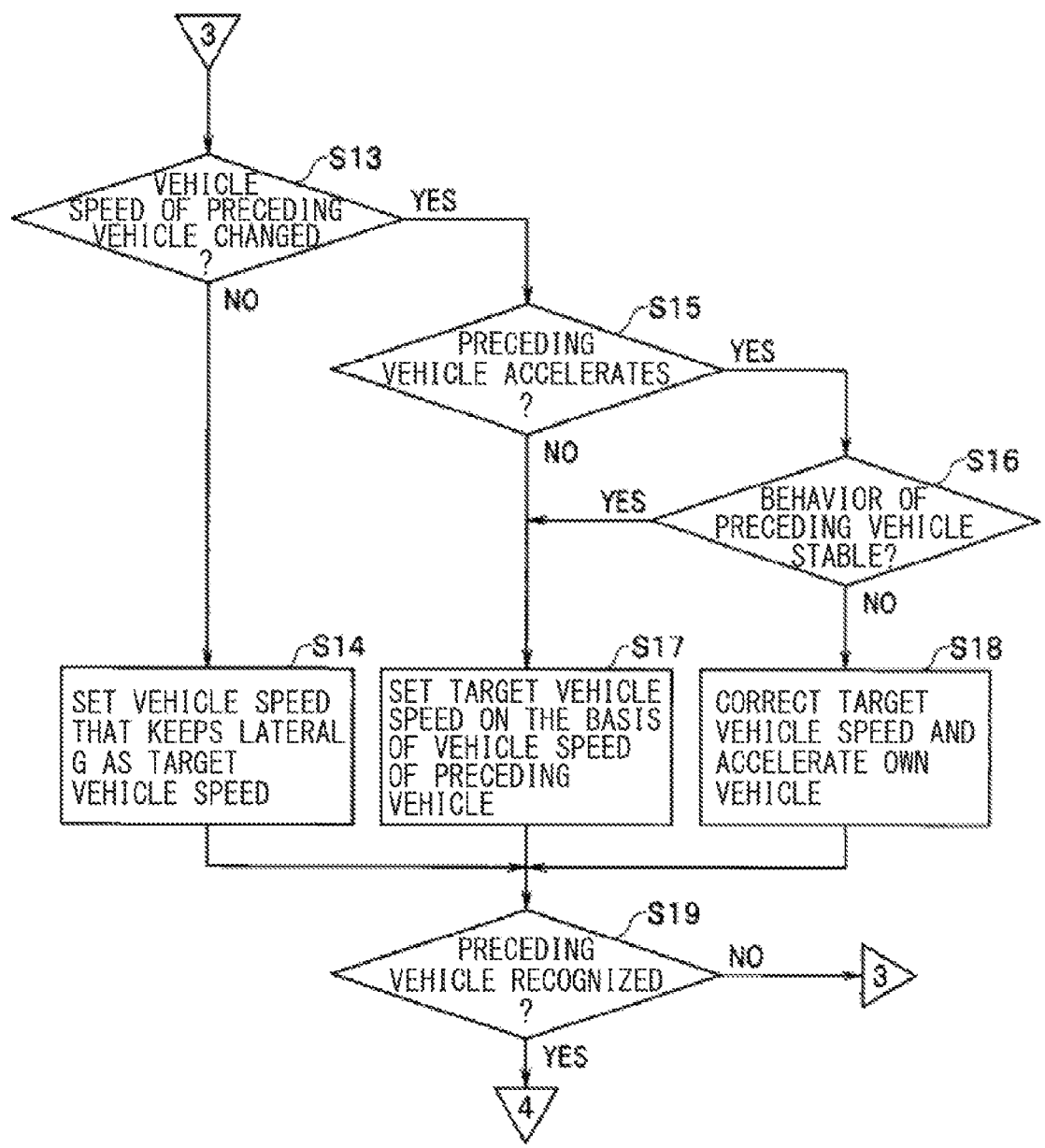
FIG. 4 is yet another flowchart illustrating an example of the routine of the preceding vehicle following control process.

The driving assist control unit 31 may execute the ACC control upon traveling the curved road C on the basis of a routine of a preceding vehicle following control process illustrated in FIGS. 2 to 4. For example, the curved road C may continuously include an entrance clothoid section, a constant curvature section, and an exit clothoid section. The entrance clothoid section may be a region in which a curve curvature increases gradually in accordance with a predetermined clothoid curvature from an entrance of the curved road C. The constant curvature section may be a region that is continuous to the entrance clothoid section and in which the curve curvature becomes the maximum. The exit clothoid section may be a region in which the curve curvature so changes as to be decreased gradually in an exit direction in accordance with a predetermined clothoid curvature from the constant curvature section, and that is coupled to a straight road.

The routine of the preceding vehicle following control process may be executed for each predetermined calculation cycle after a start-up of a system. First, in step S1, the driving assist control unit 31 may load the front traveling environment data acquired by the front traveling environment recognition unit 21d of the camera unit 21. Thereafter, in step S2, the driving assist control unit 31 may determine whether the own vehicle M travels the curved road C.

Whether the own vehicle M travels the curved road C may be determined on the basis of a road shape acquired from the front traveling environment data. For example, whether the own vehicle M travels the curved road C may be determined on the basis of a curvature (1/R) of the middle of the lane lines that define the right and the left of the lane along which the own vehicle M travels. If the curvature (1/R) is equal to or greater than a predetermined threshold, the driving assist control unit 31 may determine that the own vehicle M travels the curved road C, and may cause the process to proceed to step S3. If the curvature (1/R) is less than the predetermined threshold, the driving assist control unit 31 may determine that the own vehicle M travels a straight road or a slightly curved road close to the straight road, and may end the routine.

In some embodiments, the curvature (1/R) may be acquired on the basis of map data based on an own vehicle position on a road map estimated by the own vehicle position estimation calculation unit 12a of the own vehicle position estimating unit 11. In some embodiments, whether the own vehicle M travels the curved road C may be determined on the basis of the steering angle detected by the steering angle sensor 34. In some embodiments, whether the own vehicle M travels the curved road C may be determined on the basis of the vehicle speed detected by the vehicle speed sensor 33 and the lateral acceleration rate detected by the lateral acceleration sensor 35.

In step S3 after determining that the own vehicle M travels the curved road C, the driving assist control unit 31 may perform a preceding vehicle recognition that determines whether the preceding vehicle P travels ahead of the own vehicle M along the lane along which the own vehicle M travels, on the basis of the front traveling environment data. In one embodiment, the process in step S3 may serve as a "preceding vehicle recognizing unit".

If the preceding vehicle P is recognized as illustrated in FIG. 5, the process may proceed to step S4. In step S4, the driving assist control unit 31 may cause the own vehicle M to continue traveling while following the preceding vehicle P on the basis of the ACC control, and may end the routine.

The process may proceed to step S5 from step S3 in a case where data on the preceding vehicle P is not acquired from the front traveling environment data. For example, the data on the preceding vehicle P is not acquirable from the front traveling environment data in a case where the preceding vehicle P becomes temporarily outside the angle of view of the imaging performed by the camera unit 21 as illustrated in FIG. 6 due to traveling of the preceding vehicle P along the sharp curve. In step S5, the driving assist control unit 31 may cause the own vehicle M to keep the current vehicle speed of following the preceding vehicle P by the ACC control, following which the process may proceed to step S6. This configuration helps to suppress the unnecessary acceleration of the own vehicle M even in a case where the own vehicle M has temporality lost track of the preceding vehicle P, and to reduce the sense of discomfort to be felt by a person on board. In one embodiment, the process in step S5 may serve as a "vehicle speed keep controlling unit".

In step S6, the driving assist control unit 31 may determine whether the vehicle-to-vehicle communication between the own vehicle M and the preceding vehicle P is possible on the basis of a detection signal acquired from the vehicle-to-vehicle communicator 32. The vehicle-to-vehicle communicator 32 may perform a bidirectional wireless communication between the own vehicle M and another vehicle. For example, the vehicle-to-vehicle communicator 32 may acquire positional data of the preceding vehicle P, a vehicle speed of the preceding vehicle P, and/or any other data on the preceding vehicle P, in a case where the mutual communication between the own vehicle M and the preceding vehicle P is possible. The positional data of the preceding vehicle P may include data on a latitude, a longitude, and/or an altitude.

If the vehicle-to-vehicle communication between the own vehicle M and the preceding vehicle P is determined as not being possible in step S6, the process may proceed to step S7. If the vehicle-to-vehicle communication between the own vehicle M and the preceding vehicle P is determined as being possible in step S6, the process may proceed to step S13.

In step S7, the driving assist control unit 31 may determine a change in the curve curvature (1/R) in the middle of the lane lines for each calculation cycle, on the basis of the front traveling environment data. If the curve curvature of the curved road C is the same as a previous value or has changed to have a greater value, the driving assist control unit 31 may determine that the own vehicle M travels in the entrance clothoid section or the constant curvature section of the curved road C as illustrated in FIGS. 5 and 6, and may stand by until the own vehicle M travels in the exit clothoid section. If the curvature of the curved road C has changed to have a smaller value than the previous value, the driving assist control unit 31 may determine that the own vehicle M travels in the exit clothoid section, and the process may proceed to step S8. In one embodiment, the process in step S7 may serve as a "curve curvature detecting unit".

In step S8, the driving assist control unit 31 may determine whether the preceding vehicle P is recognized or caught, on the basis of the front traveling environment data. If the preceding vehicle P is recognized, the process may proceed to step S9. If the preceding vehicle P is still not recognized, the process may proceed to step S10.

In step S9, the driving assist control unit 31 may calculate a vehicle speed of the preceding vehicle P on the basis of a relative vehicle speed between the preceding vehicle P and the own vehicle M, and set a target inter-vehicle distance between the own vehicle M and the preceding vehicle P on the basis of the thus-calculated vehicle speed. In addition, the driving assist control unit 31 may set the own vehicle speed that keeps the target inter-vehicle distance between the own vehicle M and the preceding vehicle P. In a case where the inter-vehicle distance is to be made short by accelerating the own vehicle M due to the longer inter-vehicle distance than the target inter-vehicle distance upon setting the own vehicle speed, the own vehicle M may be accelerated at an acceleration rate at which the lateral G is generated of a level that does not give an anxiety to or gives less anxiety to the person on board including the driver.

In step S10, the driving assist control unit 31 may cause the own vehicle M to accelerate at the acceleration rate at which the lateral G is generated of a level that does not give the anxiety to or gives less anxiety to the person on board, on the basis of the curve curvature (1/R) of the middle of the lane which is determined on the basis of the front traveling environment data. Thereafter, the process may proceed to step S11. In step S11, the driving assist control unit 31 may determine whether the preceding vehicle P is recognized or caught, on the basis of the front traveling environment data. If the preceding vehicle P is not recognized, the driving assist control unit 31 may execute the process of step S10 repeatedly. If the preceding vehicle P is recognized, the process may proceed to step S12. In one embodiment, the process in step S10 may serve as an "acceleration rate controlling unit".

In step S12 after step S9 or step S11, the driving assist control unit 31 may execute the preceding vehicle following traveling at a speed that keeps the target inter-vehicle distance, and may end the routine.

In step S13 following the determination in step S6 that the vehicle-to-vehicle communication between the own vehicle M and the preceding vehicle P is possible, the driving assist control unit 31 may acquire the vehicle speed of the preceding vehicle P, or the preceding vehicle speed, on the basis of data on the preceding vehicle P acquired by the vehicle-to-vehicle communication. Further, the driving assist control unit 31 may compare the preceding vehicle speed acquired at the time of the previous calculation with the current preceding vehicle speed. If the preceding vehicle speed is not changed, the process may proceed to step S14. If the preceding vehicle speed is changed, the process may proceed to step S15.

In step S14, the driving assist control unit 31 may set the vehicle speed that keeps the current lateral G as the target vehicle speed of the own vehicle M, and the process may proceed to step S19. In an example case where the current lateral G that acts on the own vehicle M is 0.3 G, executing the acceleration of the own vehicle M in which the lateral G is 0.5 G to follow the preceding vehicle P can give the person on board a sense of anxiety. Accordingly, the own vehicle M may be caused to travel along the curved road at the vehicle speed that keeps the current lateral G to reduce the sense of anxiety to be felt by the person on board.

In step S15 after step S13, the driving assist control unit 31 may determine whether the preceding vehicle P accelerates, on the basis of the vehicle speed of the preceding vehicle P, or the preceding vehicle speed, acquired by the vehicle-to-vehicle communication. If the preceding vehicle P is determined as accelerating, the process may proceed to step S16. If the preceding vehicle P is determined as decelerating, the process may proceed to step S17. In step S16, the driving assist control unit 31 may determine a behavior of the preceding vehicle P, on the basis of data acquired by the vehicle-to-vehicle communication, such as a change in the vehicle speed of the preceding vehicle P, or the preceding vehicle speed, a yaw rate of the preceding vehicle P, or lateral G of the preceding vehicle P.

If the behavior of the preceding vehicle P is determined as being stable, the process may proceed to step S17. If the behavior of the preceding vehicle P is determined as being unstable, the process may proceed to step S18. For example, a stability of the preceding vehicle P may be determined on the basis of a change in the lateral G or a change in the yaw rate of the preceding vehicle P. In some embodiments, the behavior of the preceding vehicle P may be determined as being unstable in a case where the lateral G that acts on the preceding vehicle P is 0.3 G and where the lateral G has increased to 0.5 G as a result of the acceleration of the preceding vehicle P.

In step S17 after step S15 or step S16, the driving assist control unit 31 may set the vehicle speed of the preceding vehicle P acquired by the vehicle-to-vehicle communication as the target vehicle speed of the own vehicle M, and the process may proceed to step S19. In step S18 after step S16, the driving assist control unit 31 may set the vehicle speed of the preceding vehicle P, or the preceding vehicle speed, as the target vehicle speed of the own vehicle M. Further, the driving assist control unit 31 may set the acceleration rate that causes the current own vehicle speed to reach the target vehicle speed to accelerate the own vehicle M. Thereafter, the process may proceed to step S19.

The acceleration rate to be set in step S18 may be an acceleration rate at which the suppressed lateral G is generated of a level that does not give an anxiety to or gives less anxiety to the person on board including the driver. Accordingly, in an example case where the lateral G that acts on the preceding vehicle P is increased from 0.3 G to 0.5 G, the own vehicle M may refrain from executing the acceleration in which the lateral G becomes 0.5 G from 0.3 G, and the own vehicle speed may be caused to reach the target vehicle speed at the acceleration rate at which the suppressed lateral G is generated of a level that does not give an anxiety to or gives less anxiety to the person on board. In one embodiment, the processes from step S13 to step S18 may serve as a "target vehicle speed setting unit".

In step S19 after step S14, step S17, or step S18, the driving assist control unit 31 may determine whether the preceding vehicle P is recognized or caught, on the basis of the front traveling environment data. If the preceding vehicle P is not recognized, the process may return to step S13. If the preceding vehicle P is recognized, the process may return to step S12, and the driving assist control unit 31 may execute the preceding vehicle following traveling with the target vehicle speed set in step S17 or step S18 being kept. Thereafter, the driving assist control unit 31 may end the routine.

According to the example embodiment, in a case where the preceding vehicle P has entered a sharp curve in which the curvature is relatively large while the own vehicle M so travels along the curved road as to follow the preceding vehicle P and the where the camera unit 21 has temporarily lost track of the preceding vehicle P, the own vehicle M is caused to travel in step S5 with the preceding-vehicle-following vehicle speed that is at the time immediately before losing track of the preceding vehicle P being kept. Thus, it helps to prevent the own vehicle M from accelerating to the set vehicle speed and to suppress the execution of the unnecessary acceleration. Accordingly, it helps to reduce a sense of discomfort to be given to the person on board including the driver.

In some embodiments, in a case where the vehicle-to-vehicle communication is determined as being possible between the preceding vehicle P and the own vehicle M thereafter, the target vehicle speed of the own vehicle M may be set on the basis of the vehicle speed of the preceding vehicle P acquired by the vehicle-to-vehicle communication. Accordingly, it helps to keep a better traveling property of following the preceding vehicle P.

In some embodiments, in a case where the own vehicle M has recognized the preceding vehicle P while traveling along the curved road, the own vehicle speed may be set in step S9 that keeps the target inter-vehicle distance between the preceding vehicle P and the own vehicle M, and the own vehicle M may be caused to accelerate at the acceleration rate at which the lateral G is generated of a level that does not give an anxiety to or gives less anxiety to the person on board including the driver. Accordingly, it helps to reduce a sense of discomfort to be felt by the person on board in this case as well.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, a unit that acquires the front traveling environment data is not limited to the camera unit 21. In some embodiments, the front traveling environment data acquiring unit may be a millimeter-wave radar, a microwave radar, an ultrasonic sensor, or LiDAR (Light Detection and Ranging), or a combination of any of them with a monocular camera.

According to at least one embodiment of the technology, it is possible to provide a vehicle traveling control apparatus that makes it possible to suppress execution of unnecessary acceleration and reduce a sense of discomfort to be given to a person on board, even in a case where an own vehicle has temporarily lost track of a preceding vehicle at a curved road having a relatively large curvature while the own vehicle so travels as to follow the preceding vehicle.

The driving assist control unit 31 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assist control unit 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving assist control unit 31 illustrated in FIG. 1.

The invention claimed is:

1. A vehicle traveling control apparatus to be applied to a vehicle, the vehicle traveling control apparatus comprising:
  a traveling environment data acquiring unit configured to acquire traveling environment data related to a traveling environment ahead of the vehicle; and
  a traveling controller configured to cause the vehicle to travel at a set speed and to maintain a distance from a preceding vehicle by adjusting the set speed to follow the preceding vehicle, wherein
  the traveling controller comprises:
    a preceding vehicle recognizing unit configured to recognize the preceding vehicle as a target to be followed by the vehicle, on a basis of the traveling environment data;
    a curve curvature detecting unit configured to detect a curvature of a curved road, on a basis of the traveling environment data or road map data; and
    a vehicle speed keep controlling unit configured to maintain the adjusted set speed even when the preceding vehicle recognizing unit loses track of the preceding vehicle as the target after the preceding vehicle enters the curved road.

2. A vehicle traveling control apparatus to be applied to a vehicle, the vehicle traveling control apparatus comprising:
  a traveling environment data acquiring unit configured to acquire traveling environment data related to a traveling environment ahead of the vehicle;
  a traveling controller configured to cause the vehicle to travel and follow a preceding vehicle, wherein the traveling controller comprises:
    a preceding vehicle recognizing unit configured to recognize the preceding vehicle as a target to be followed by the vehicle, on a basis of the traveling environment data;
    a curve curvature detecting unit configured to detect a curvature of a curved road, on a basis of the traveling environment data or road map data; and
    a vehicle speed keep controlling unit configured such that in a case where the preceding vehicle recognizing unit loses track of the preceding vehicle as the target to be followed by the vehicle, the vehicle speed keep controlling unit causes the vehicle to travel on a basis of a preceding-vehicle-following vehicle speed that is before losing track of the preceding vehicle, the preceding-vehicle-following vehicle speed being a vehicle speed of the vehicle directed to follow the preceding vehicle; and
  an acceleration rate controlling unit configured to:
    determine, on a basis of the curve curvature detecting unit, whether the curvature of the curved road is changed to a smaller curvature after causing, by the vehicle speed keep controlling unit, the vehicle to travel on the basis of the preceding-vehicle-following vehicle speed before losing track of the preceding vehicle; and
    accelerate the vehicle on a basis of an acceleration rate at which a lateral acceleration rate set on a basis of the curvature of the curved road is generated, in a case where the curvature of the curved road is changed to the smaller curvature.

3. The vehicle traveling control apparatus according to claim 2, further comprising a communicator configured to allow for a communication of data between the vehicle and the preceding vehicle, wherein
  the traveling controller further comprises a target vehicle speed setting unit configured to:
    detect a change in a vehicle speed of the preceding vehicle on a basis of data on the vehicle speed of the preceding vehicle acquired by the communicator after causing, by the vehicle speed keep controlling unit, the vehicle to travel on the basis of the preceding-vehicle-following vehicle speed before losing track of the preceding vehicle, in a case where the communication between the vehicle and the preceding vehicle by the communicator is determined as being possible; and
    set a target vehicle speed of the vehicle on a basis of the data on the vehicle speed of the preceding vehicle, in a case where the preceding vehicle is determined as decelerating on a basis of the change in the vehicle speed of the preceding vehicle.

4. The vehicle traveling control apparatus according to claim 3, wherein the target vehicle speed setting unit is configured to:
  read data on a behavior of the preceding vehicle acquired by the communicator, in a case where the preceding vehicle is determined as accelerating on the basis of the change in the vehicle speed of the preceding vehicle; and
  suppress an acceleration rate of the vehicle that causes a current vehicle speed of the vehicle to reach the target vehicle speed, in a case where the behavior of the preceding vehicle is determined as being unstable.

5. The vehicle traveling control apparatus according to claim 4, further comprising a lateral acceleration rate detector configured to detect a lateral acceleration rate to act on the vehicle, wherein the target vehicle speed setting unit is configured to set, as the target vehicle speed, a vehicle speed of the vehicle that keeps the detected lateral acceleration rate, in a case where the vehicle speed of the preceding vehicle is determined as not being changed.

6. The vehicle traveling control apparatus according to claim 3, further comprising a lateral acceleration rate detector configured to detect a lateral acceleration rate to act on the vehicle, wherein the target vehicle speed setting unit is configured to set, as the target vehicle speed, a vehicle speed of the vehicle that keeps the detected lateral acceleration rate, in a case where the vehicle speed of the preceding vehicle is determined as not being changed.

7. A vehicle traveling control apparatus to be applied to a vehicle, the vehicle traveling control apparatus comprising:

a sensor configured to acquire traveling environment data related to a traveling environment ahead of the vehicle; and circuitry configured to cause the vehicle to travel at a set speed and to maintain a distance from a preceding vehicle by adjusting the set speed to follow the preceding vehicle, wherein the circuitry is further configured to:

recognize the preceding vehicle as a target to be followed by the vehicle, on a basis of the traveling environment data;

detect a curvature of a curved road, on a basis of the traveling environment data or road map data; and maintain the adjusted set speed even when tracking the preceding vehicle as the target is lost after the preceding vehicle enters the curved road.

* * * * *